United States Patent
Dalsgaard et al.

(10) Patent No.: US 6,546,251 B1
(45) Date of Patent: Apr. 8, 2003

(54) METHOD AND ARRANGEMENT FOR CHANGING CELLS

(75) Inventors: Lars Dalsgaard, Oulu (FI); Antero Lundell, Turku (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/396,853

(22) Filed: Sep. 15, 1999

(30) Foreign Application Priority Data

Sep. 16, 1998 (FI) .................................................. 982000

(51) Int. Cl.[7] ................................................. H04Q 7/20
(52) U.S. Cl. ........................ 455/437; 436/432; 436/443
(58) Field of Search ................................. 455/432, 436, 455/437, 443

(56) References Cited

U.S. PATENT DOCUMENTS

| | | | | |
|---|---|---|---|---|
| 5,257,257 A | | 10/1993 | Chen et al. | 370/18 |
| 5,499,386 A | * | 3/1996 | Karlsson | 455/437 |
| 5,640,395 A | | 6/1997 | Hamalainen et al. | 370/322 |
| 5,729,534 A | | 3/1998 | Jokinen et al. | 370/284 |
| 5,729,541 A | | 3/1998 | Hamalainen et al. | 370/337 |
| 5,768,267 A | * | 6/1998 | Raith et al. | 370/329 |
| 5,790,534 A | | 8/1998 | Kokko et al. | 370/335 |
| 5,802,465 A | | 9/1998 | Hamalainen et al. | 455/403 |
| 5,946,320 A | | 8/1999 | Decker | 370/428 |
| 6,094,581 A | * | 7/2000 | Fried et al. | 455/449 |
| 6,295,450 B1 | * | 9/2001 | Lyer et al. | 455/417 |
| 6,308,066 B1 | * | 10/2001 | Ranta et al. | 370/331 |

FOREIGN PATENT DOCUMENTS

| | | |
|---|---|---|
| WO | WO 95/02309 | 1/1995 |
| WO | WO 97/15168 | 4/1997 |
| WO | WO 98/36591 | 8/1998 |

* cited by examiner

*Primary Examiner*—Thanh Cong Le
*Assistant Examiner*—Alan T. Gantt
(74) *Attorney, Agent, or Firm*—Perman & Green, LLP (57) ABSTRACT

The invention pertains to an improved method and arrangement for cell selection performed by a mobile station in a cellular radio system. Particularly the invention pertains to cell selection in a situation where the mobile station is connected to a special service such as the GPRS (General Packet Radio Service) offered by the current cell. An essential idea of the invention is that a base station sends to the mobile station information about whether the base station of a neighbouring cell offers the same service. This information is sent preferably in a signalling message of a certain service, such as the PSI3 message of the GPRS system (70) or in a system information SI message of a lower-level service, e.g. in a SI3 message. The mobile station changes serving base stations directly, without having to use lower-level system signalling (72) in between. The invention helps adjust cell reselection such that the load on the mobile station and radio signalling, caused by measurement of possible new cells and by message traffic, is as small as possible.

23 Claims, 5 Drawing Sheets

METHOD AND ARRANGEMENT FOR CHANGING CELLS

BACKGROUND OF THE INVENTION

The invention relates to an improved method and arrangement for cell reselection by a mobile station in a cellular radio system. In particular the invention relates to cell reselection in a situation where the mobile station is attached to a special service such as the General Packet Radio Service (GPRS), for example, offered by the current cell.

To provide background for the invention it will be next described by way of example prior-art arrangements for changing the active cell in the GSM (Global System for Mobile telecommunications) system and in a GPRS service used in the GSM.

Figures 1, 2, 3:
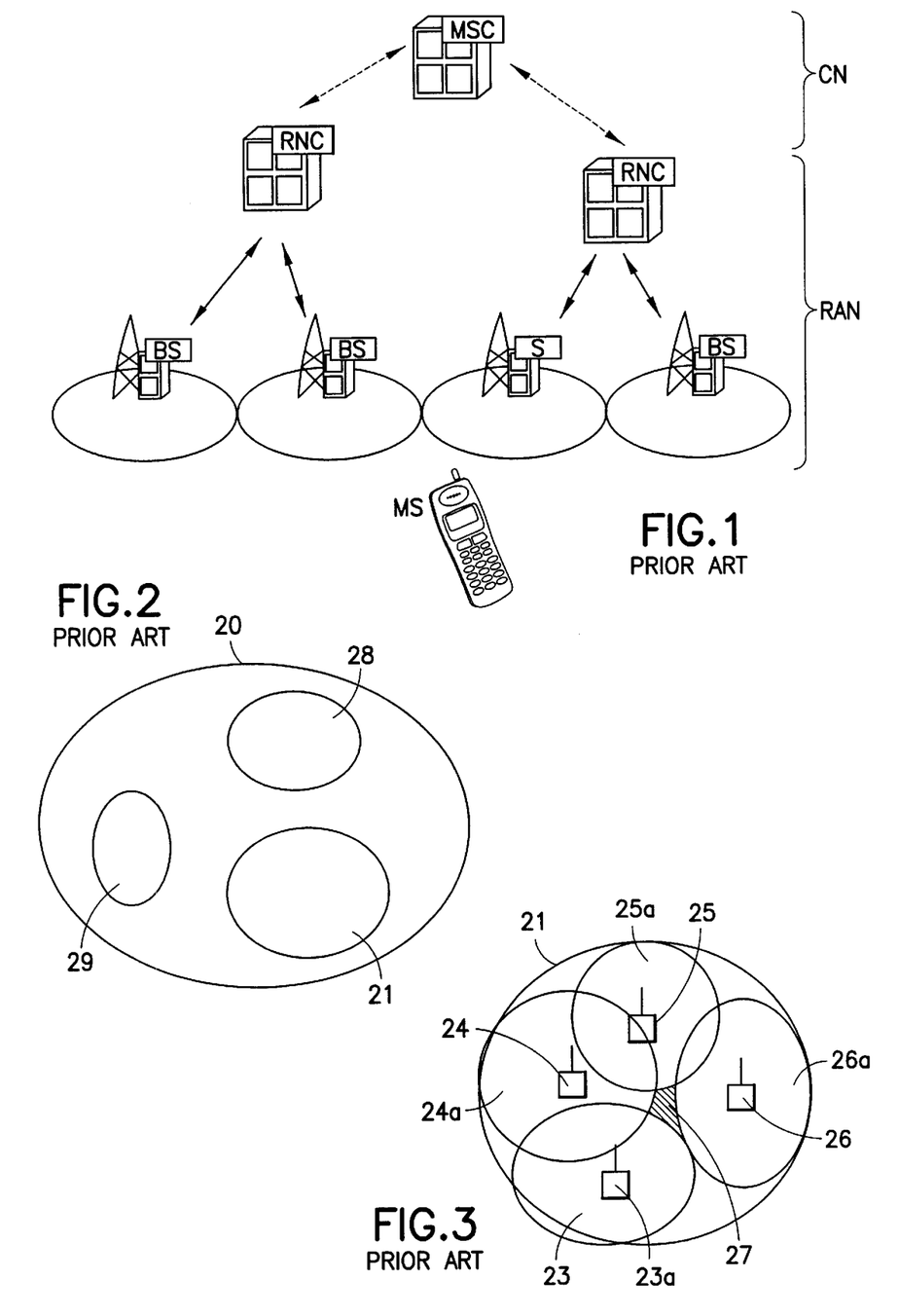
FIG. 1 shows a cellular radio system according to the prior art.
FIG. 2 shows coverage areas in a cellular radio system.
FIG. 3 shows cells in an area offering a certain service.

FIG. 1 shows the basic structure of digital cellular systems. Typically, a mobile communications network comprises at least one core network CN and one or more radio access networks RAN. The core networks CN consist of various central systems which may offer various intelligent network services in addition to versatile communications possibilities. A core network comprises mobile services switching centers MSC, other network elements (which in the GSM include the serving GPRS support node, SGSN, and gateway GPRS support node, GGSN, for example), and the associated transmission systems. The radio access networks are located between the core network and mobile stations. A radio access network comprises base transceiver stations BTS and a radio network controller RNC. Each base station BS has a fixed connection to the radio network controller RNC. The radio network controllers in turn have fixed connections to at least one core network node. Between the mobile stations MS and core networks CN there may operate one or more radio access networks, and through a given radio access network a mobile station MS can be connected with several core networks CN.

FIG. 2 shows the coverage areas of services offered by a cellular system. Area 20 shows the coverage of basic GSM services, and areas 21, 28 and 29 are GPRS coverage areas within area 20. Typically, area 21 may be the center of a city, area 28 may be e.g. an airport, and area 29 may be a research and development or other office complex where GPRS service is needed.

FIG. 3 shows in more detail the GPRS base stations 23, 24, 25 and 26 and their coverage areas 23a, 24a, 25a and 26a in a city center 21. FIG. 3 does not show the basic-service GSM base stations the coverage areas of which are within area 21. FIG. 3 shows that even an area that offers GPRS services may have locations, here location 27, which are not within the coverage area of any GPRS base station. In such a location a mobile station has to connect to a base station which only offers the basic GSM service. In addition, it can be seen from FIG. 3 that when a mobile station is moving in an area where the base station coverage areas are small, the serving base station has to be changed at short intervals.

A mobile station in a cellular radio system always tries to choose a base station coverage area to camp on such that the quality of the radio connection is adequate. Traditionally, the cell selection has been based on the measurement of the received radio signal level either at the mobile station or at the base station For example, in the GSM system each base station transmits a signal on a so-called broadcast control channel BCCH which has different frequencies at adjacent base stations. Mobile stations measure the strengths of the BCCH signals they receive and decide on the basis of the measurements which cell is the most advantageous from the radio connection quality perspective. Base stations also inform mobile stations about the BCCH frequencies used in the neighbouring cells so that the mobile stations will know what frequencies they have to listen to in order to find the BCCH transmissions of the neighbouring cells. In each cell the BCCH channel transmission also includes information about how the mobile stations can make so-called random access requests in that particular cell in order to set up a connection.

Figure 4:
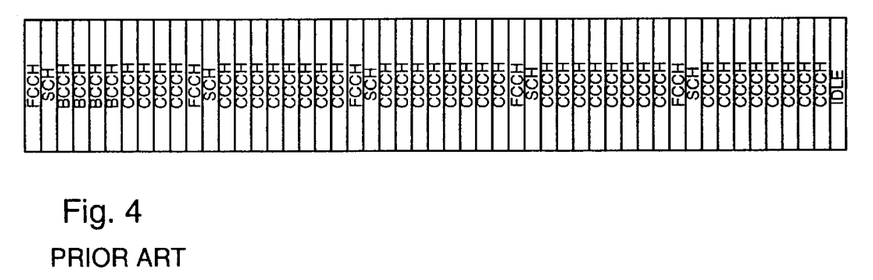
FIG. 4 shows a GSM 51 multiframe.

FIG. 4 shows the GSM broadcast frequency channels in a so-called 51 multiframe. In addition to the BCCH, there are included the frequency correction channel FCCH, synchronization channel SCH, and the common control channel CCCH.

Figure 5A:
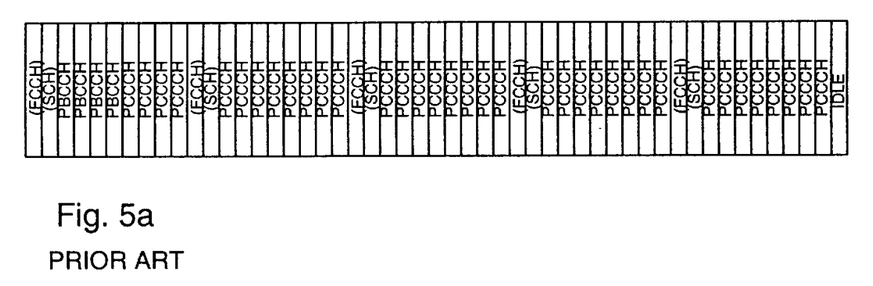
FIG. 5a shows a GPRS 51 multiframe.
Figure 5B:
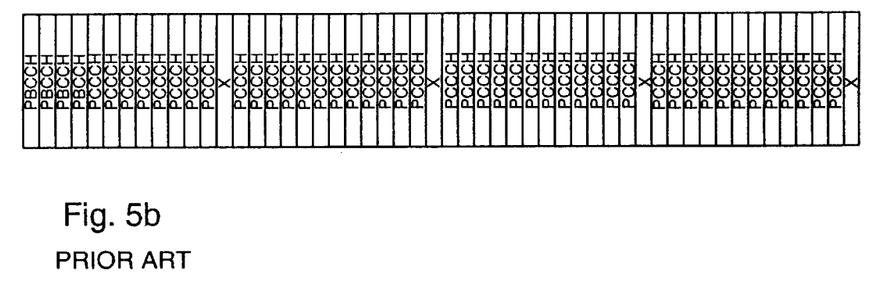
FIG. 5b shows a GPRS 52 multiframe with PBCCH in one radio block.
Figure 5C:
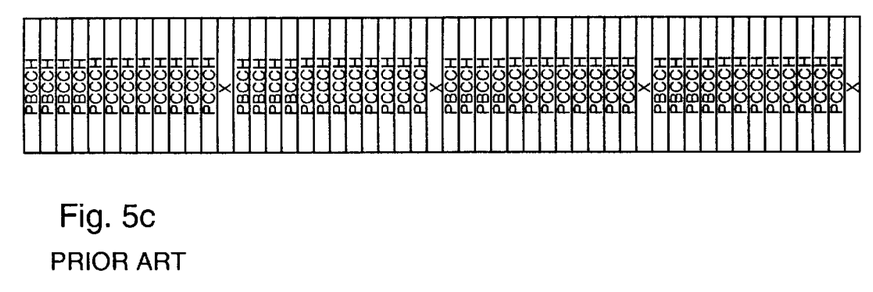
FIG. 5c shows a GPRS 52 multiframe with PBCCH in four radio blocks.

FIGS. 5a, 5b and 5c depict the GPRS 51 and 52 multiframe structures. In the GPRS broadcast channels the GSM BCCH and CCCH channels are replaced by their GPRS counterparts, namely the PBCCH and PCCCH channels. In the 51 multiframe structure, FIG. 5a, the FCCH and SCH channels are illustrated, even though they are not specified in the current GPRS specification. In the GPRS 52 multiframe structure no FCCH or SCH channels not shown, due to the fact that they are not specified in the 52 multiframe structure of the current specification. In the 52 multiframe structure shown in FIG. 5b there is PBCCH (PSI) only in one radio block per multiframe, while in the 52 multiframe structure shown in FIG. 5c there is PBCCH (PSI) information in four radio blocks per multiframe. Even though 51 multiframe structure is used as an example in this text, the ideas illustrated here are also valid for the 52 multiframe structures. This is because of the fact that there are no essential differences between the two frame structures In the GPRS system, the list of the base stations' neighbour cells is sent in a so-called Packet Information type 3 (PSI3) and Packet Information type 3bis (PSI3bis) messages transmitted on the PBCCH channel.

In the GSM system, each base station includes in its BCCH signal the data required for connection requests. In addition, each base station may regularly transmit at the ECCH frequency so-called system information (SI) messages. These messages contain information about the ability of the base station to provide advanced services, especially GPRS network service.

If a mobile station camped on a cell that offers basic GSM service needs to change to another cell, it listens to the neighbouring cells' BCCH channels and receives SI messages from these. On behalf of this information the mobile station can determine whether a cell supports GPRS service or not, and if it does, the mobile station can start operating on the GPRS channel immediately. For example, an idling mobile station can at regular intervals update its information about the neighbouring cells' characteristics by receiving SI messages so that the information can be quickly retrieved from the mobile station's memory at the moment of possible cell reselection.

Figure 6:
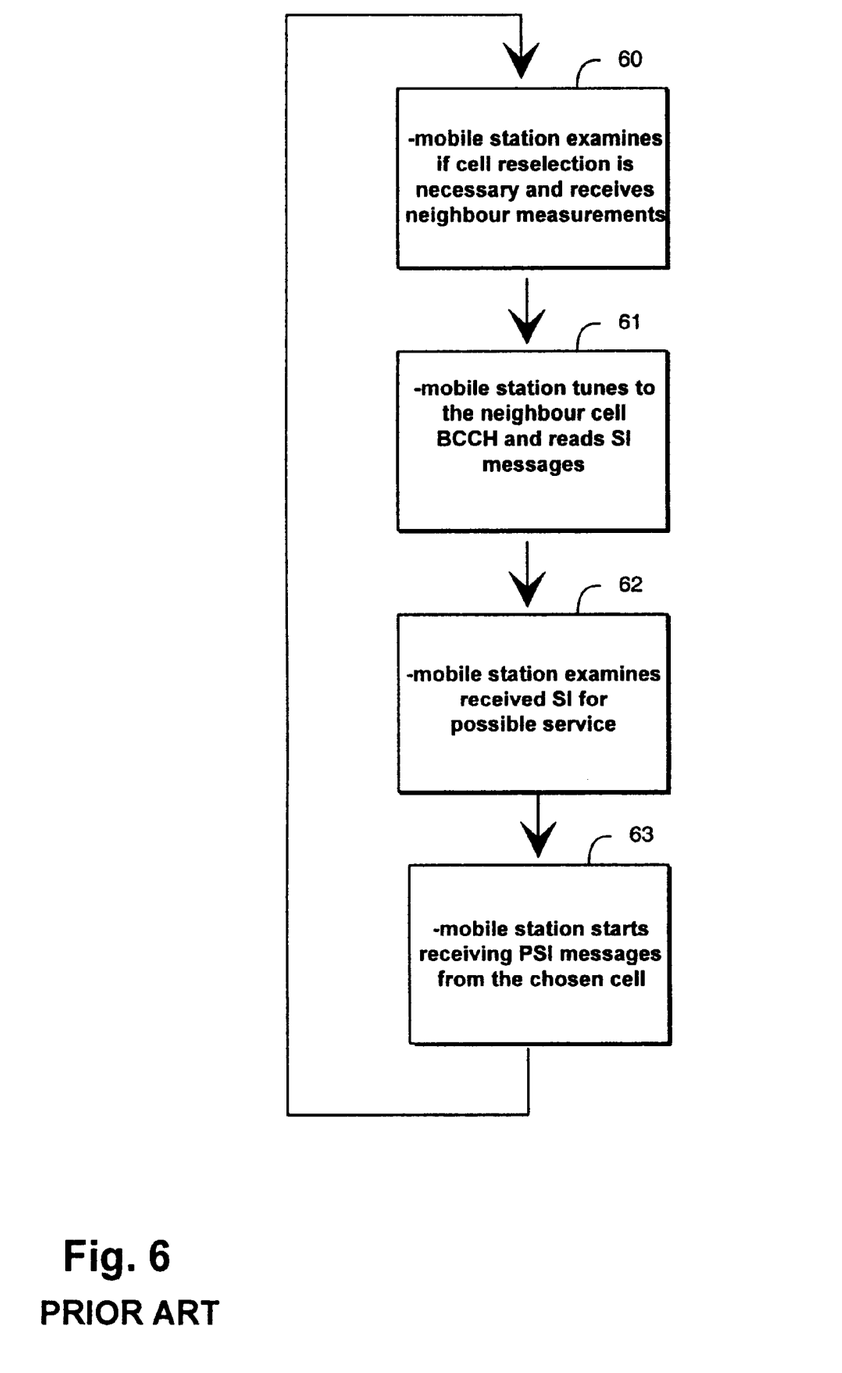
FIG. 6 shows a flowchart of a prior-art method for changing serving cells.

FIG. 6 shows the prior-art process that takes place when a mobile station already in the GPRS service needs to change serving cell. The mobile station has already received a neighbour cell list from the serving base station. This list is used in order to continuously examine whether or not there is a need to change the serving cell, phase 60. If the mobile station finds that cell reselection is necessary, it tunes to the neighbour cell and starts receiving the system information of the BCCH of the chosen cell, phase 61. On the basis of these data the mobile station makes a preliminary selection of the cell and examines that the cell can offer a minimum of necessary service, phase 62. When the mobile station has chosen a suitable cell to get service from, the mobile station starts receiving the necessary SI or PSI from this cell in order to obtain GPRS service, phase 63. The chosen cell may or may not offer GPRS service.

A disadvantage of the method described above is that it is not sensible, as regards power consumption and communications resources, for the mobile station, while camped on a GPRS cell, to receive basic-GSM SI messages, but in practice the mobile station starts receiving SI messages only after the cell reselection procedure has started. Thus the mobile station does not keep an up-to-date list of the neighbour cell characteristics. The arrangement described above puts a load on the mobile station connected with the GPRS service because the mobile station camped on a cell first has to read from the signal sent by the base station of the cell a list of the other BCCH frequencies and then receive, demodulate and decode a short period of the BCCH transmission arriving at each of the frequencies mentioned in the list in order to find out whether the neighbour cells can provide GPRS network service. It may be that a major part of the neighbour cells do not support the GPRS, in which case the mobile station only wastes time and electric power in receiving, demodulating and decoding the BCCH channels of such cells. The reception of said GSM SI messages may take nearly 10 seconds, which usually is too long a delay in cell reselection, especially if the mobile station is moving fast. Consequently, the mobile station uses more power, data communications slows down and the connection with the base station may be temporarily cut off.

SUMMARY OF THE INVENTION

An object of this invention is to provide a method and arrangement in which the use of communications resources to find a new suitable cell is more efficient than in prior-art methods and arrangements.

An essential idea in the invention is that the serving base station sends to the mobile station the information about whether the base station in a neighbour cell provides a given service. This information is preferably sent in a signalling message on a channel of a given service, such as GPRS, to which the mobile station is connected. The cell reselection is then preferably performed directly at the level of the determined service.

The "determined service" means here most preferably a service other than the lowest, basic service level of the communication system.

For example, when the mobile station is operating on GPRS packet channels, the information about whether a neighbour cell's base station is offering GPRS or not, is advantageously sent in a PSI3 message on a GPRS packet channel. At its simplest, the invention can be realized in the GPRS system by adding to the packet channel's PSI3 message a one-bit information element for each neighbour cell which indicates whether the neighbour cell in question supports the GPRS service. If the mobile station is not connected to a special service such as the GPRS, the information can be sent in the basic system's information message, such as SI3.

The invention makes it possible for a mobile station connected to a given service to perform a direct change between the serving base station and another base station that offers the same service, without having to resort to lower-level system signalling. So, a mobile station connected to GPRS, for example, need not receive system information messages transmitted by the neighbour cells on the basic GSM channels in conjunction with cell reselection but it can select the new GPRS-supporting cell directly at GPRS level.

Cell reselection in mobile stations can be made more efficient than in prior-art systems if the mobile stations have prior knowledge of the service levels offered by the base stations. In the arrangement according to the invention a base station sends information about the service levels of the neighbouring base stations in signalling messages of the current service so that in order to find a new cell the mobile station receives, demodulates and decodes only the transmissions of those neighbouring base stations which transmit a strong enough signal and which according to the information sent by the current base station can offer the current service level. The mobile station may maintain various lists of such neighbouring base stations into whose cells it may move in the near future.

So, the invention helps adjust cell reselection such that the load on the mobile station and radio signalling, caused by measurement of possible new cells and reception of messages, is as small as possible.

In accordance with the invention a mobile station can as quickly as possible select from among available cells a new cell which best meets the communications needs of the mobile station. Cell reselection may be performed while the mobile station is in the so-called idle state, in which there is no active data connection between the mobile station and a base station, or it may be performed during an active data connection.

The method according to the invention for selecting a new serving cell in a cellular radio system where a determined service level is required in the new cell, the method including a phase of transmitting information about neighbouring cells from a base station of a cellular radio system to a mobile station, wherein the base station generates a message containing information about the neighbouring cells and sends the message to the mobile station, is characterized in that the base station includes in said message information about whether the neighbour cell mentioned in the message offers the determined service to mobile stations and the cell reselection is performed directly at the level of the determined service. The method according to the invention for realizing cell reselection in a cellular radio system which comprises base stations with associated cells as well as mobile stations, is characterized in that it comprises phases in which a) a mobile station links up with a service offered by the system, b) a base station sends to the mobile station a signalling message in accordance with a determined service, containing information about neighbour cells located near to the base station as well as information about whether said neighbour cells provide a determined service, c) on the basis of said message the mobile station preliminarily selects a group of new cells offering a determined service, d) the mobile station performs measurements among the preliminarily selected cells in order to find a suitable new cell, whereby
   if the measurements indicate that among the preliminarily selected cells there is at least one suitable new cell, the mobile station selects a new cell from among the preliminarily selected cells, and
   if the measurements indicate that among the preliminarily selected cells there is no suitable new cell, the mobile station selects a new cell from among cells other than the preliminarily selected cells, and e) the cell reselection is performed directly at the level of the determined service.

The invention is also directed to a method for transmitting information about neighbouring cells from a base station of a cellular radio system to a mobile station, wherein the base station generates a message containing information about the neighbouring cells and sends the message to the mobile station, and which is characterized in that the base station includes in said message information about the service level offered to mobile stations by the neighbour cell mentioned in the message and that said signalling message includes at least one of the following pieces of information:

whether or not the neighbour cell is in blocking state, length of the multiframe used by the neighbour cell, location of control channel synchronization information.

The invention is also directed to a base station and mobile station of a cellular radio system.

The base station according to the invention, comprising means for offering a determined service and means for generating signalling messages and means for transmitting them to mobile stations, is characterized in that it contains information about a group of neighbour cells located in the vicinity of the base station, including information about whether a neighbour cell provides said determined service, it is equipped so as to include said information in a signalling message, and it is equipped so as to the cell selection is perform the cell reselection directly at the level of the determined service.

The cellular mobile station according to the invention, equipped with means for connecting to a determined service, and comprising means for receiving signalling messages from base stations as well as means for performing cell-specific measurements to find a suitable cell for the purpose of cell reselection, is characterized in that it is equipped so as to indicate information about the service level of a neighbour cell based on signalling messages transmitted by the current serving base station, and to perform cell reselection on the basis of said information directly at the level of the determined service.

The invention is further directed to a cellular radio system, which comprises base stations and, in association with them, cells, as well as mobile stations and in which the base stations are equipped so as to generate messages and send them to mobile stations in the form of signalling messages, and the mobile stations are equipped so as to operate at a determined service level and receive signalling messages from base stations, and which is characterized in that it contains information accessible by a base station about a group of neighbour cells in the vicinity of the cell of the base station, including information about the service level offered in and by said neighbour cells to mobile stations, the system in question being arranged so as to transmit said information from the base station to a mobile station in a signalling message for the purpose of selecting a new serving cell to perform the cell reselection directly at the level of the determined service.

Preferred embodiments of the invention are described in the dependent claims.

BRIEF DESCRIPTION OF THE DRAWING

The invention will now be described in more detail with reference to the preferred embodiments presented by way of example and to the accompanying drawings wherein.

DETAILED DESCRIPTION OF THE INVENTION

Above in conjunction with the description of the prior art reference was made to FIGS. 1 to 6, so below in the description of the invention and its preferred embodiments reference will be made mainly to FIGS. 7 and 8.

Figure 7:
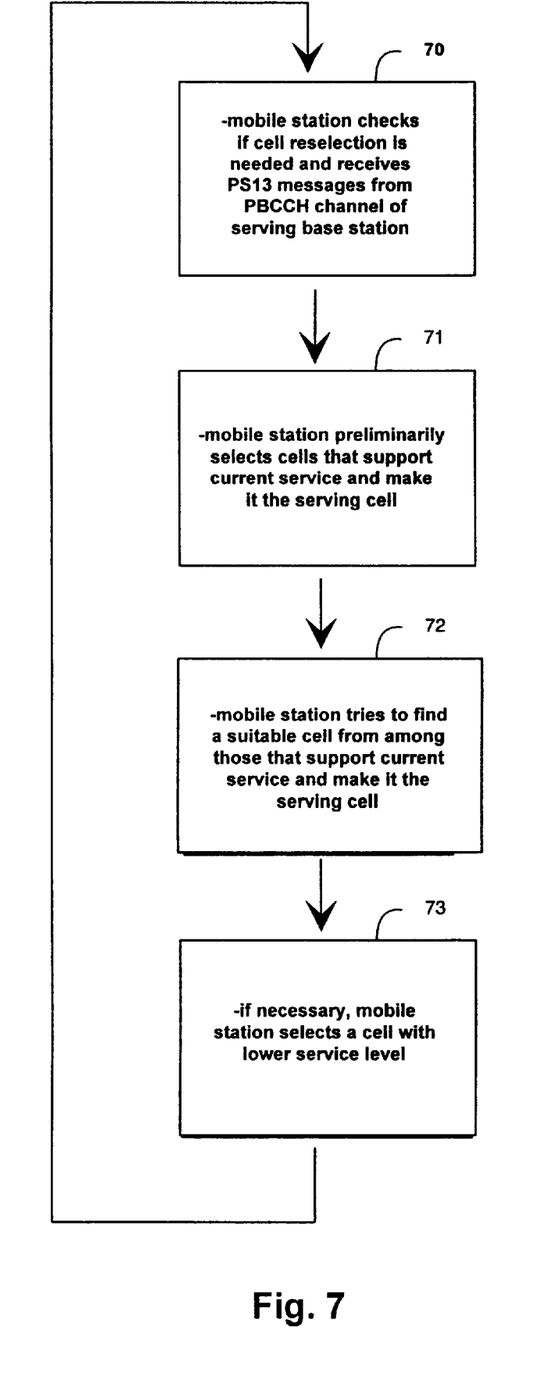
FIG. 7 shows a flowchart of a method according to the invention for chancing serving cells.

FIG. 7 shows a flowchart of a method according to the invention for changing the serving cell. A mobile station finds out if there is need to change the serving cell and receives PSI3 messages from the packet broadcast control channel PBCCH or packet associated control channel PACCH of the current base station in phase 70. A PSI3 message contains a list of neighbour cells and information about whether each particular cell supports the current service level, such as the GPRS network service. The information about whether a neighbouring base station supports the current GPRS service is transmitted in the PSI3 message preferably in the form of a one-bit field per each neighbouring base station. In that case, value 0 for the bit could mean that the base station does not support the GPRS service and value 1 could mean that the base station supports the GPRS service. The information may also be transmitted in a lower service level system information (SI) message, say, in a SI3 message, especially if the mobile station is not connected to the GPRS service.

Next, the mobile station may preliminarily select the cells that support the current service, phase 71. The selection of the group of cells in phase 71 may also be based on that the mobile station tries to find a neighbour cell which, according to a PSI message sent by the current base station, belongs to the same location area with the current base station or to the home location area of the mobile station or to a private picocell network, in which the operation is more advantageous to the user than on average. The invention does not limit on what grounds the cells are discriminated in phase 71, in addition to the information about whether a particular neighbour base station supports the current service level, in this case the GPRS service.

Then the mobile station selects a new cell from among the preliminarily selected cells on the basis of channel measurement data, among other things, in a known manner by measuring the power level of the signal received from the current base station and/or the error rate of the demodulated and decoded signal, and attempts to make the selected cell the new serving cell, phase 72.

So, in phase 72 the mobile station tries to find a new cell from among the neighbour cells which in phase 71 were found suitable on the basis of their service level and possible other criteria. As a prerequisite for the mobile station to change cells, the new cell has to meet known suitability criteria, which e.g. in the GSM system mean high enough values of known cell-specific C1 and C2 parameters. The suitability criteria and other known cell selection functions in the GSM and DCS1800 systems are specified in European Broadcasting Union's (EBU) and European Telecommunications Standards Institute's (ETSI) standards ETS 300 535 (GSM 03.22) and ETS 300 578 (GSM 05.08). On a general level, the same approach can be applied to other digital cellular radio systems as well.

In the above-mentioned phases the mobile station need not start receiving lower service level signaling channels. If, however, it is not possible to select a cell offering the current service level, the mobile station starts in phase 73 looking for a suitable cell from among the cells discriminated in phase 71. If the mobile station has time, it can look for a suitable cell from among the discriminated cells, in accordance with phase 73, even if a suitable cell with a "better level" had been found in phase 72. By looping continuously or regularly the loop formed by states 70, 71, 72 and 73 the mobile station can continuously maintain a list that indicates the best possible new cells.

A base station can advantageously include in PSI3 messages information primarily about those neighbour cells that support the same service as the base station itself. If it is not necessary to include in every message the information of all neighbour cells, the length of the messages can be made shorter if desired.

Below it is described in more detail a possible PSI3 message structure as information elements:

<PSI3 Message Content>::=
  <MESSAGE_TYPE: bit (6)>
  <PSI3_BIS_COUNT: bit (3)>
    {L|H<Global TFI: Global TFI IE>}
  <Serving Cell parameters: Serving Cell parameters struct>
  <General Cell Selection parameters: Gen Cell Sel Struct>
  <Neighbour Cell parameters: Neighbour Cell parameters struct>
  <spare padding>
<Serving Cell Params struct>::=
  <RA_CODE: bit (8)>
  <GPRS_RXLEV_ACCESS_MIN: bit (6)>
  <GPRS_MS_TXPWR_MAX_CCH: bit (5)>
    {0|1<HCS Serving Cell parameters: HCS struct>}
<HCS struct>::=
  <GPRS_PRIORITY_CLASS: bit (3)>
  <GPRS_HCS THR_: bit (5)>
<Gen Cell Sel struct>::=
  <GPRS_CELL_RESELECT_HYSTERESIS: bit (3)>
  <C31_HYST: bit (1)>
    {0|1<RA_RESELECT_HYSTERESIS: bit (3)>}
<Neighbour Cell params struct>::=
  {1<START_FREQUENCY: bit (0)>
    <Cell selection params: Cell selection struct>
    <NR OF_REMAINING_CELLS: bit (4)>
    <FREQ_DIFF_LENGTH: bit (3)>
    {<FREQUENCY_DIFF: bit (n)>
      <Cell selection params: Cell selection struct>}*}*0;
<Cell selection struct>::=
  <BSIC: bit (6)>
  <SAME_RA_AS_SERVING_CELL: bit (1)>
  <Cell Reselection parameters: Cell reselection params struct>
    {0|1<GPRS_RXLEV_ACCESS_MIN: bit (6)><GPRS_MS_TXPWR_MAX_CCH: bit (5)>}
    {0|1<GPRS_TEMPORARY_OFFSET: bit (3)><GPRS_PENALTY_TIME: bit (5)>}
    {0|1<GPRS_RXLEV_ACCESS_MIN: bit (6)>}
    {0|1<HCS params: HCS struct>}

The information according to the invention about the ability of a neighbour cell to support the GPRS network service is advantageously coded in the <Cell Reselection parameters: Cell reselection params struct>field which according to the invention is added to the PSI3 message in this case. The contents of this field are e.g. as follows:

<Cell reselection params struct>::=
  <GPRS_SUPPORTING_CELL: bit (1)>
  <CELL_BARR_INDICATION: bit (1)>
  <51_MF_FRAME_STRUCTURE: bit (1)>
    {0|1<ARFCN: bit (10)>}

The first of these bits, i.e. <GPRS_SUPPORTING_CELL: bit (1)>indicates whether the cell supports the GPRS service (value=1) or not (value=0). The second bit, i.e. <CELL_BARR_INDICATION: bit (1)>indicates whether the cell is in the blocking state (1) or not (0). Blocking state means that the cell is blocked for use i.e. it is barred. The last bit, i.e. <51_MF_FRAME_STRUCTURE: bit (1)>indicates whether the GPRS service uses the 51 multiframe (0) or the 52 multiframe The optional 10-bit-long {0|1<ARFCN: bit (10)>} element may indicate where the control channel synchronization data can be found in case the FCCH and SCH channels are not in use.

Apart from the <Cell Reselection parameters: Cell reselection params struct> field the PSI3 message described above is in accordance with the prior art. The described cell selection parameters can naturally be included in other System Information messages than described, such as SI3, SI4, SI7, SI8 or SI13. Also the transmission of the concerned System Infonnation message may depend on whether GPRS is supported or not. Also the names of the bit fields may naturally be different from the ones described.

Let us next examine in more detail, how the cell reselection can be accomplished directly at the level of the GPRS service.

As described above, the information on whether a neighbouring cell supports a GPRS can be included in PSI3 or PSI3bis message of the serving cell. This way the mobile station receives information—already before finishing the the actual cell reselection—whether the possible new cell supports supports GPRS or not. The mobile station utilize this information in the cell reselection process. In case PBCCH is mapped on a non-hopping carrier, an ARFNC field (as described above) can be added. in the message.

In a case (I), for example, the new cell supports GPRS and the PBCCH is mapped on a non-hopping carrier, and the mobile station can tune directly to the PBCCH of the new cell without a need to read the BCCH information of the new cell.

Also in the case (II) where the new cell supports GPRS, and the PBCCH is mapped in a on a non-hopping carrier, and the mobile station does not receive the ARFCN information on the serving carrier, the mobile station can find this information from the SI13 message of the new cell.

On the other hand, in a case (III) where the new cell supports GPRS and the PBCCH is mapped on a hopping carrier (PBCCH), the MS needs additional information from the new cell in order to describe the hopping PBCCH. This information can be received from the SI13 information element of the new cell.

In cases where the mobile station already has information that the new cell supports GPRS (eg. GPRS_SUPPORTING_CELL bit) the mobile station may, if necessary, tune to the new cell and read the SI13 information element which includes information on the location of the PBCCH of the new cell. This can be performed already before the cell reselection is finished. This reading of SI13 can be performed while the mobile station is still operating on the current serving cell. By doing this the mobile station can receive information on PBCCH of the new cells and act according to this information before actually tuning to the new cell (cases II and III above). This procedure will remove the necessity for the mobile station to read the whole set of SI messages on the BCCH of the new cell during the cell reselection, thereby reducing the actual cell reselection time.

Figure 8:
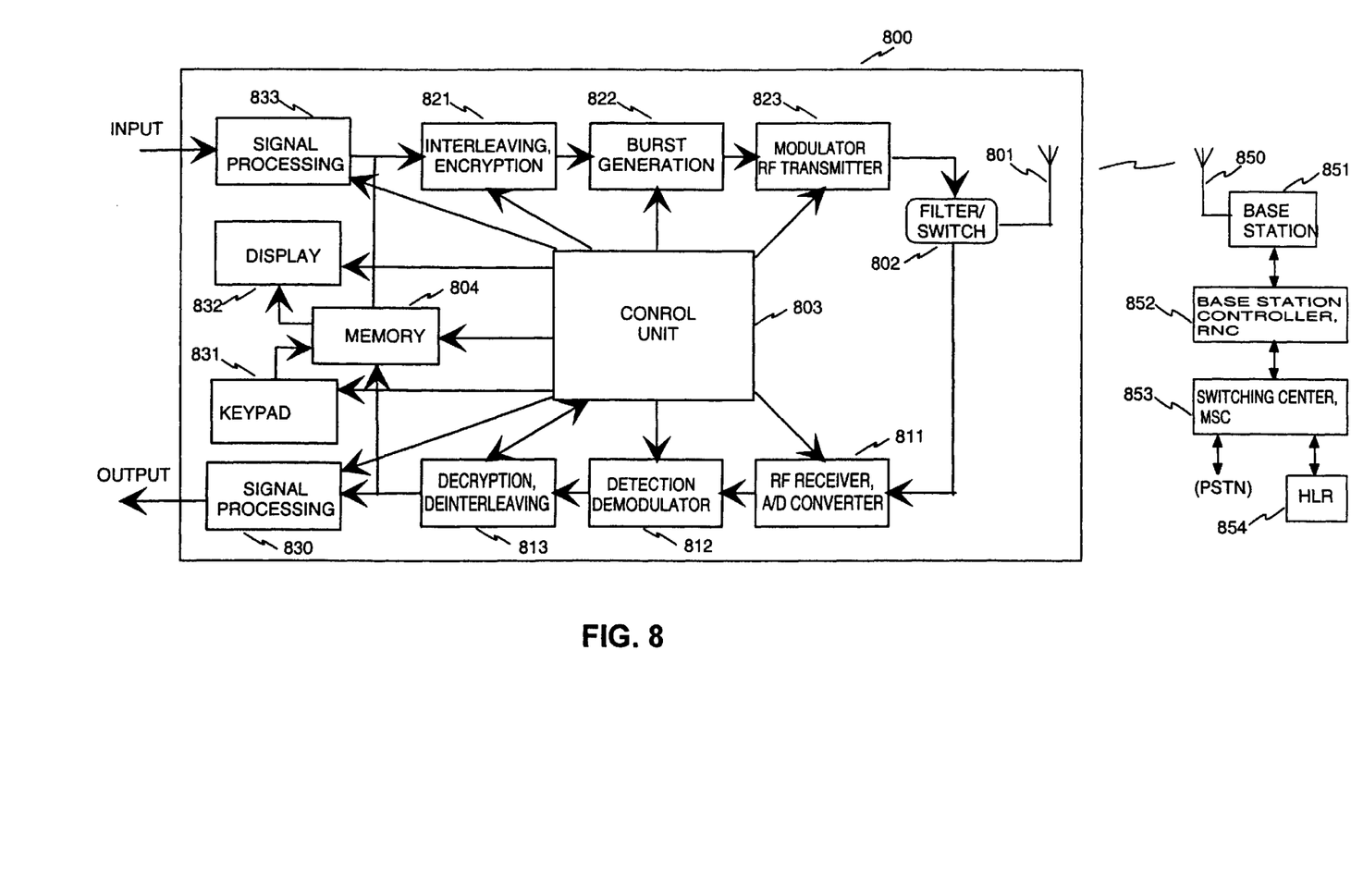
FIG. 8 shows a cellular mobile station according to the invention and its connection to a cellular radio system.

FIG. 8 shows a simplified block diagram of a mobile station 800 according to the invention and its connection to a cellular system. The mobile station comprises an antenna 801 for receiving radio-frequency (RF) signals transmitted by base stations. A received RF signal is directed by a switch 802 to a RF receiver 811 where the signal is amplified and converted digital. The signal is then detected and demodulated in block 812. Block 813 performs decryption and deinterleaving. Then follows signal processing in block 830. Received data may be stored as such in the mobile station's memory 804 or, alternatively, the processed packet data are taken after the signal processing to a possibly external device such as a computer. A control unit controls the above-mentioned reception blocks in accordance with a program stored in the unit.

Transmission from the mobile station is performed e.g. as follows. Controlled by the control block 803, block 833 performs possible signal processing on the data and block 821 performs interleaving and encryption on the processed signal to be transmitted. The encoded data are arranged in bursts, block 822, which are modulated and amplified into a RF signal to be transmitted, block 823. The RF signal to be transmitted is lead to an antenna 801 by means of a switch 802. The processing and transmission functions described above are controlled by the control unit 803.

In the mobile station of FIG. 8, the components that are essential from the invention's perspective include the known reception blocks 811–813, by means of which the mobile station receives, demodulates and decodes the messages transmitted by base stations and measures the levels of the received signals, as well as the control block 803 which processes the information contained in the messages and controls the operation of the mobile station. Part of the memory 804 of the mobile station has to be allocated to information regarding neighbour cell selection, said information including data received from base stations about the neighbour cells' PBCCH frequencies and service levels. Naturally, a detachable memory medium, such as the known SIM card, may also be used for said purpose. The mobile station uses the transmission blocks 821–823 to transmit the messages related to cell selection to base stations.

Compared to the prior art the invention's demands on the base stations' and mobile stations' hardware are quite low. A base station 851 and/or base station controller 852 has access to a database (not shown) which includes information about the neighbour cells' PBCCH frequencies and service levels, such as the ability to offer GPRS service. An operator usually has operation and maintenance (OM) capabilities for altering the contents of these databases statically (e.g. when a new base station starts operation in the vicinity of existing base stations) or dynamically (e.g. when a nearby base station is driven down for service). Prior-art base stations generate and transmit many kinds of messages, so the creation and transmission of messages concerning the information in the database can be realized by means 851, 852 according to the prior art.

The embodiments described above are naturally exemplary only and do not limit the application of the invention. Especially it should be noted that even though the above examples pertain to GSM and GPRS systems, the invention can be applied to any other digital cellular system as well. Such systems include especially the Digital Communications System at 1800 MHz (DCS1800), Interim Standard 54 (IS-54), and the Personal Digital Cellular (PDC) system. Particularly in forthcoming so-called third-generation digital cellular systems the service levels offered by the cells to the mobile stations may considerably differ from a cell to another. Proposed third-generation systems include the Universal Mobile Telecommunications System (UMTS) and the Future Public Land Mobile Telecommunications System/International Mobile Telecommunications at 2000 MHz (FPLMTS/IMT-2000). In these proposed systems the cells are divided according to their size and characteristics into different-sized cells, and the transmission rate can be used as an example of the service level. Picocells have the highest transmission rate and macrocells the lowest. The cells may partly or totally overlap and there may be different mobile stations, so that all mobile stations may not be able to use the service levels of all base stations. Thus the invention can be applied to transmit various data about different services supported by neighbour base stations in the form of signalling messages of the current service.

What is claimed is:

1. A method for selecting a new serving cell in a cellular radio system where a determined service level is required in the new cell, the method including a phase of transmitting information about neighbouring cells from a base station (BS, 851) of a cellular radio system to a mobile station (MS, 800), wherein the base station generates a message (SI3, PSI3, PSI3bis) containing information about the neighbouring cells and sends the message to the mobile station, wherein the base station includes in said message (PSI3, PSI3bis) information about whether the neighbour cell mentioned in the message (70) offers the determined service (GPRS) or another level service to mobile stations, and wherein the cell reselection is performed directly at the level of the determined service (GPRS) if the determined service be available, else to a cell of other service level.

2. The method of claim 1, wherein the mobile station is connected to a certain service network (GPRS) and said message (PSI3, PSI3bis) is transmitted in the form of signalling in said service network.

3. The method of claim 1, wherein said information is coded into said signalling message transmitted by the base station as one bit per neighbour cell.

4. The method of claim 1, wherein said information is transmitted in a message according to the service level to which the mobile station is connected.

5. The method of claim 1, wherein said signalling message includes at least one of the following pieces of information:

whether or not the neighbour cell is in blocking state, length of the multiframe used by the neighbour cell, location of control channel synchronization information.

6. The method of claim 1, wherein said service network is a GPRS network and said signalling message is a PSI3 message or a PSI3bis message.

7. The method of claim 1, wherein said information is transmitted in a system information message at least partly in the form of the following information elements:

<Cell reselection params struct>::=

<GPRS_SUPPORTING_CELL: bit (1)>

<CELL_BARR_INDICATION: bit (1)>.

8. The method of claim 7, wherein said information is transmitted in a system information message at least partly in the form of the following information elements:

<Cell reselection params struct>::=

<51_MF_FRAME_STRUCTURE: bit (1)>

{0[1<ARFCN: bit (10)>}.

9. A method for realizing cell reselection in a cellular radio system which comprises base stations (BS, 23–26, 851) with associated cells (23a–26a) as well as mobile stations (MS, 800), wherein the method comprises phases in which a mobile station links up with a service (GPRS) offered by the system, b) a base station sends to the mobile station a signalling message (PSI3) in accordance with a determined service, containing information about neighbour cell located near to the base station as well as information about whether said neighbour cells provide a determined service or another level service, c) on the basis of said message the mobile station preliminarily selects a group of new cells offering a determined service, d) the mobile station performs measurements among the preliminarily selected cells in order to find a suitable new cell, whereby if the measurements indicate that among the preliminarily selected cells there is at least one suitable new cell, the mobile station selects a new cell from among the preliminarily selected cells, and if the measurements indicate that among the preliminarily selected cells there is no suitable new cell, the mobile station selects a new cell from among cells other than the preliminarily selected cells, and e) the cell reselection is performed directly at the level of the determined service (GPRS).

10. The method of claim 9, wherein in phase a) the mobile station becomes connected to a determined service.

11. The method of claim 9, wherein all signalling message data used for cell reselection are read from a signalling message (PSI3, PSI3bis) of a determined service.

12. The method of claim 9, wherein said certain service is the GPRS packet data transmission service and said signalling message is a PSI3 or a PSI3bis message.

13. The method of claim 9, wherein while a given mobile station has an active voice or data connection with a given base station, the base station sends in phase b) a message to the mobile station, indicating primarily the nearby neighbour cells that provide a certain service.

14. A base station (BS, 23–26, 851) in a cellular radio system, comprising means for offering a determined service (GPRS) and means for generating signalling messages (SI3, PSI3, PSI3bis) and for transmitting them to mobile stations (MS, 800), wherein it contains information about a group of neighbour cells located in the vicinity of the base station, including information about whether a neighbour cell provides said determined service or another level service, it is equipped so as to include said information in said signalling message, and it is equipped for performing the cell reselection directly at the level of the determined service (GPRS) if the determined service be available, else to a cell of other service level.

15. A base station according to claim 14, wherein said signalling message is transmitted in the form of a signalling message according to the determined service.

16. The method of claim 15, wherein said determined service is the GPRS packet data transmission service and said signalling message is a PSI3 message or a PSI3bis message.

17. A mobile station (MS, 800) in a cellular radio system, equipped with means for connecting to a determined service (GPRS), other than the basic service, and comprising means for receiving signalling messages (PSI3, PSI3bis) from base stations (BS, 23–26, 851) as well as means for performing cell-specific measurements to find a suitable cell for the purpose of cell reselection, wherein the mobile station is equipped so as to indicate information about the service level of a neighbour cell based on signalling messages (PSI3, PSI3bis) transmitted by the current serving base station, and to perform cell reselection on the basis of said information directly at the level of the determined service (GPRS) if the determined service be available, else to a cell of other service level.

18. The mobile station of claim 17 wherein it comprises means for receiving signalling messages according to the determined service (GPRS) and said signalling message is a signalling message according to a certain service.

19. The mobile station of claim 17, wherein said service is the GPRS packet data transmission service and said signalling message is a PSI3 message or a PSI3bis message.

20. A cellular radio system which comprises base stations (BS, 23–26, 851) with associated cells (23a–26a) as well as mobile stations (MS, 800) and in which the base stations are equipped so as to generate messages and send them to mobile stations in the form of signalling messages (SI3, PSI3, PSI3bis), and the mobile stations are equipped so as to operate at a determined service level (GPRS) and receive signalling messages (SI3, PSI3, PSI3bis) from base stations, wherein the cellular radio system has information accessible by a base station about a group of neighbour cells in the vicinity of the cell of the base station, including information about the service level offered in and by said neighbour cells to mobile stations, the system being arranged so as to transmit said information from the base station to a mobile station in a signalling message (SI, PSI3, PSI3bis) for the purpose of selecting a new serving cell to perform the cell reselection directly at the level of the determined service (GPRS) if the determined service be available, else to a cell of other service level.

21. The cellular radio system of claim 20, wherein the base stations are equipped so as to generate messages and send them to mobile stations in the form of signalling messages (PSI3, PSI3bis) of a determined service level, and the mobile stations are equipped so as to operate at a determined service level (GPRS) and receive signalling messages (PSI3, PSI3bis) of the determined service level from base stations, and said signalling message is a signalling message (PSI3, PSI3bis) according to the determined service (GPRS).

22. A method for transmitting information about neighbouring cells from a base station (BS, 851) of a cellular radio system to a mobile station (MS, 800), wherein the base station generates a message (SI3, PSI3) containing information about the neighbouring cells and sends the message to the mobile station, wherein the base station includes in said message information about the service level offered to mobile stations by the neighbour cell mentioned in the message (70) and that said signalling message includes information enabling cell reselection, to be performed directly at the level of a determined service if the determined service be available, else to a cell of other service level, and wherein the signalling message further includes at least one of the following pieces of information:

whether or not the neighbour cell is in blocking state, length of the multiframe used by the neighbour cell, location of control channel synchronization information.

23. The method of claim 22, wherein said information is transmitted in a system information message in the form of the following information elements:

<Cell reselection params struct>::=

<GPRS_SUPPORTING_CELL: bit (1)>

<CELL_BARR_INDICATION: bit (1)>.

* * * * *